(12) United States Patent
Da et al.

(10) Patent No.: US 6,252,545 B1
(45) Date of Patent: Jun. 26, 2001

(54) ENHANCEMENT OF SIGNAL-DETECTION CAPABILITY OF GPS SYSTEMS

(75) Inventors: Ren Da, Bernards Township; Giovanni Vannucci, Middletown Township, Monmouth County, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/497,418

(22) Filed: Feb. 4, 2000

(51) Int. Cl.$^7$ ...................................................... H04B 7/185
(52) U.S. Cl. ..................................... 342/357.1; 342/357.12
(58) Field of Search ........................... 342/357.06, 357.1, 342/357.12; 455/12.1; 701/213

(56) References Cited

U.S. PATENT DOCUMENTS

| | | | |
|---|---|---|---|
| 5,402,347 | * 3/1995 | McBurney et al. | 364/443 |
| 5,535,237 | * 7/1996 | LaPadula et al. | 375/200 |
| 5,657,232 | * 8/1997 | Ishikawa et al. | 364/449.9 |
| 5,959,575 | * 9/1999 | Abbott | 342/357.06 |
| 6,118,977 | * 9/2000 | Vannucci | 455/12.1 |

* cited by examiner

Primary Examiner—Dao Phan
(74) Attorney, Agent, or Firm—Steve Mendelsohn

(57) ABSTRACT

Estimated Global Position System (GPS) navigation data is used to increase the signal integration interval. In one embodiment, a WAG (wireless assisted GPS) server receives GPS signals and demodulates the navigation data modulated onto the GPS signals. The WAG server utilizes known features of the demodulated navigation data to generate estimated navigation data for the satellite. This estimation can be made several seconds or even minutes ahead of time. The wireless terminal uses this estimated navigation data to perform a data wipe-off operation to enable the integration interval to be increased (e.g., beyond 20 ms), thereby increasing overall signal-detection sensitivity at the wireless terminal. In another embodiment, information from strong GPS signals is used to detect weak GPS signals from other satellites. In this embodiment, strong GPS signals are received directly by the wireless terminal from the satellites. After strong GPS signals have been detected, the strong GPS signals are demodulated to compute satellite ephemerides including navigation data. The demodulated navigation data is then matched with known features of the navigation data to estimate the navigation data for weak GPS signals. The estimated navigation data is then used to increase the integration interval for weak GPS signals so that weak GPS signals can also be detected at the wireless terminal.

32 Claims, 4 Drawing Sheets

ENHANCEMENT OF SIGNAL-DETECTION CAPABILITY OF GPS SYSTEMS

CROSS-REFERENCE TO RELATED APPLICATIONS

The subject matter of this application is related to U.S. patent application Ser. No. 08/927,432 filed Sep. 11, 1997 and to U.S. patent application Ser. No 08/927,434 filed Sep. 11, 1997 the teachings of both of which are incorporated herein by reference.

BACKGROUND OF THE INVENTION

1. Field of the Invention

The present invention relates to satellite navigation systems, and, more particularly, to satellite navigation systems employing modulation schemes to enhance signal-detection sensitivity.

2. Description of the Related Art

A satellite navigation system, such as the Global Positioning System (GPS), comprises a constellation of satellites that transmit GPS signals that can be used by a wireless terminal to determine the wireless terminal's position.

FIG. 1 is a schematic diagram of GPS system 100 of the prior art. In prior art system 100, one or more satellites 101 of a satellite constellation transmit GPS signals 102 that are received by a wireless terminal 103. As is known in the field, the positioning operation is performed by receiving GPS signals 102 from three or more satellites. The basic method of determining position is based on knowing the time difference for each of the satellites. The time difference for each satellite is the time required for a GPS signal 102 initiated at the satellite to be received by wireless terminal 103. When GPS signals 102 from three satellites are simultaneously received, a "two-dimensional" position (latitude and longitude) can be determined. When GPS signals 102 are received from four or more satellites simultaneously, a "three-dimensional" position (latitude, longitude, and altitude) can be determined.

Each satellite 101 orbits earth at a known speed and is located at a known distance apart from the other satellites. Each satellite 101 transmits a unique GPS signal 102 which includes a carrier signal with a known frequency f modulated using a unique pseudo-random noise (PN) code and navigational data associated with the particular satellite 101, wherein the PN code includes a unique sequence of PN chips and navigation data includes a satellite identifier, timing information and orbital data, such as elevation angle $\alpha_j$ and azimuth angle $\phi_j$.

Wireless terminal 103 generally comprises a GPS receiver 105 for receiving GPS signals 102, a plurality of correlators 107 for detecting GPS signals 102 and a processor 109 having software for determining a position using the navigation data. GPS receiver 105 detects GPS signals 102 via PN codes. Detecting GPS signals 102 involves a correlation process wherein correlators 107 are used to search for PN codes in a carrier frequency dimension and a code phase dimension. Such correlation process is implemented as a real-time multiplication of a phase shifted replicated PN codes modulated onto a replicated carrier signal with the received GPS signals 102, followed by an integration and dump process.

In the carrier frequency dimension, GPS receiver 105 replicates carrier signals to match the frequencies of the GPS signals 102 as they arrive at GPS receiver 105. However, due to the Doppler effect, the frequency f at which GPS signals 102 are transmitted changes an unknown amount $\Delta f_j$ before GPS signal 102 arrives at GPS receiver 105—that is, each GPS signal 102 should have a frequency $f+\Delta f_j$ when it arrives at GPS receiver 105. To account for the Doppler effect, GPS receiver 105 replicates the carrier signals across a frequency spectrum $f_{spec}$ ranging from $f+\Delta f_{min}$ to $f+\Delta f_{max}$ until the frequency of the replicated carrier signal matches the frequency of the received GPS signal 102 wherein $\Delta f_{min}$ and $\Delta f_{max}$ are a minimum and maximum change in frequency GPS signals 102 will undergo due to the Doppler effect as they travel from satellites 101 to GPS receiver 105, i.e., $\Delta f_{min} \pounds \Delta f_j \pounds \Delta f_{max}$.

In the code phase dimension, GPS receiver 105 replicates the unique PN codes associated with each satellite 101. The phases of the replicated PN codes are shifted across code phase spectrums $R_j(spec)$ until replicated carrier signals modulated with the replicated PN codes correlate, if at all, with GPS signals 102 being received by GPS receiver 105, wherein each code phase spectrum $R_j(spec)$ includes every possible phase shift for the associated PN code. When GPS signals 102 are detected by correlators 107, GPS receiver 105 extracts the navigation data ND from the detected GPS signals 102 and uses the navigation data to determine a location for GPS receiver 105, as is well-known in the art.

Correlators 107 are configured to perform parallel searches for a plurality of PN codes across the frequency spectrum $f_{spec}$ and the code phase spectrums $R_j(spec)$. In other words, each of the plurality of correlators 107 are dedicated to searching for a particular PN code across each possible frequency between $f+\Delta f_{min}$ to $f+\Delta f_{max}$ and each possible for that PN code. When a correlator 107 completes its search for a PN code, correlator 107 searches for another PN code across each possible frequency between $f+\Delta f_{min}$ to $f+\Delta f_{max}$ and each possible phase shift for that PN code. This process continues until all PN codes are collectively searched for by the plurality of correlators 107. For example, suppose there are twelve satellites 101 thus there would be twelve unique PN codes. If GPS receiver 105 has six correlators 107, then GPS receiver 105 would use its correlators 107 to search for two sets of six different PN codes at a time. Specifically, correlators 107 search for the first six PN codes, i.e., a first correlator searches for PN-1, a second correlator searches for PN-2, etc. Upon completing the search for the first six PN codes, correlators 107 search for the next six PN codes, i.e., a first correlator searches for PN-7, a second correlator searches for PN-8, etc.

For each PN code being searched, correlator 107 performs an integration and dump process for each combination of frequency and phase shifts for that PN code. For example, suppose the frequency spectrum $f_{spec}$ includes 50 possible frequencies for the carrier signal and the code phase spectrum $R_j(spec)$ for a PN code includes 2,046 possible half-chip phase shifts. To search for every possible combination of frequency and half-chip phase shifts for the PN code, the correlator 107 would then need to perform 102,300 integrations. A typical integration interval for correlators 107 is 1 ms, which is generally sufficient for GPS receiver 105 to detect GPS signals 102 when the wireless terminal has a clear view of the sky or a direct line-of-sight to satellites 101. Thus, for the above example, 102.3 seconds would be required for one correlator 107 to search every possible combination of frequency and half-chip phase shifts for a PN code.

One disadvantage of the prior art is that, if GPS signal 102 is attenuated by a building or other obstacles, it may become impossible for a wireless terminal to receive sufficiently strong GPS signals from the minimum number of satellites needed to determine the position of the wireless terminal. This results in an interruption of the position determination. To compensate for weaker GPS signals and enhance detection of GPS signals 102, correlators 107 can be configured with longer integration intervals. In other words, detection is more accurate with longer integration intervals.

However, the presence of the navigation data limits the signal-detection capabilities of a wireless terminal by limiting the length of the integration interval to 20 ms.

SUMMARY OF THE INVENTION

If the wireless terminal has an independent knowledge of the navigation data, it can utilize this knowledge to extend its integration interval beyond 20 ms. For example, if the wireless terminal can receive navigation data from a source other than the GPS signal source (i.e., the transmitting satellite), the wireless terminal can use this information to perform a "data wipe-off" operation. The "data wipe-off" is simply a sign operation on the incoming raw RF data before the integration and dump process. The "data wipe-off" operation is based on the value of the navigation data bit. For example, if the navigation data bit is 1, the sign of incoming raw RF data is retained. But, if the navigation data bit is 0, the sign of the incoming raw RF data is flipped. After the data wipe-off operation, the wireless terminal may extent its integration interval beyond 20 ms and thereby increase its signal-detection capabilities.

In the present invention, an apparatus and a method for utilizing navigation data without limiting the integration interval is provided. Some embodiments of the present invention are capable of determining the position of a wireless terminal while avoiding many of the costs and restrictions associated with positioning systems in the prior art. In particular, some embodiments of the present invention are less expensive than wireless terminals of the prior art. Furthermore, some embodiments of the present invention are able to receive and use weaker signals than wireless terminals in the prior art. In addition, some embodiments of the present invention are capable of determining position more quickly than wireless terminals in the prior art.

In a first embodiment, in accordance with the principles of the present invention, a WAG (wireless assisted GPS) server is provided. WAG server communicates with a wireless terminal via a wireless link. The WAG server receives a GPS signal from a satellite and demodulates the navigation data modulated onto the GPS signal. It then utilizes known features of the navigation data stream and the demodulated navigation data to generate estimated navigation data, which is then transmitted to the wireless terminal. The wireless terminal uses this estimated navigation data to perform the data wipe-off operation on subsequent GPS signals to enable the integration interval to be increased beyond 20 ms, thereby increasing overall signal-detection sensitivity. The subsequent GPS signals may correspond to the same satellite or a different satellite in the satellite constellation.

In a second embodiment, the WAG server only demodulates the navigation data and forwards the demodulated data to the wireless terminal. The actual estimation takes place within the wireless terminal. The wireless terminal uses the estimated navigation data to perform data wipe-off and to enlarge integration interval for subsequent GPS signals from different satellites.

In a third embodiment, the WAG server is eliminated and the demodulation, estimation, data wipe-off and enlargement of integration interval steps are performed within the wireless terminal. In this case, integration interval is enlarged for subsequent GPS signals from different satellites.

In another embodiment, the present invention is a method for processing GPS signals modulated with navigation data, comprising the steps of: (a) recovering navigation data from a first GPS signal transmitted by a first satellite of a GPS system; (b) generating estimated navigation data based on the recovered navigation data; and (c) performing a data wipe-off operation on a subsequent GPS signal based on the estimated navigation data.

Yet, in one more embodiment, the present invention is a server for a GPS system, comprising (a) a GPS receiver configured to receive a first GPS signal modulated with navigation data and transmitted from a first satellite of the GPS system; (b) a demodulator configured to recover the navigation data from the received first GPS signal; and (c) an estimator configured to generate estimated navigation data from the recovered navigation data, wherein the server is configured to transmit the estimated navigation data for receipt by a wireless terminal configured to perform a data wipe-off operation based on the estimated navigation data.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
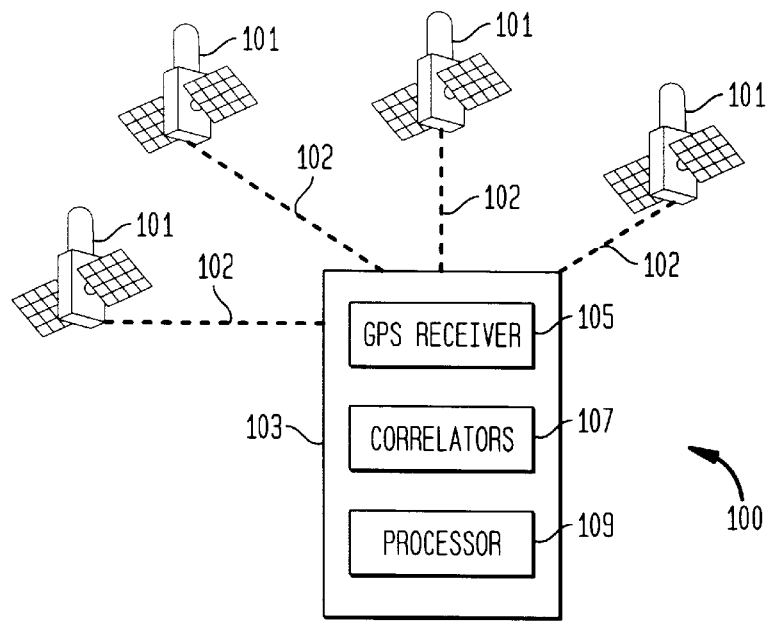
FIG. 1 is a schematic diagram of a prior art GPS system.
Figure 2:
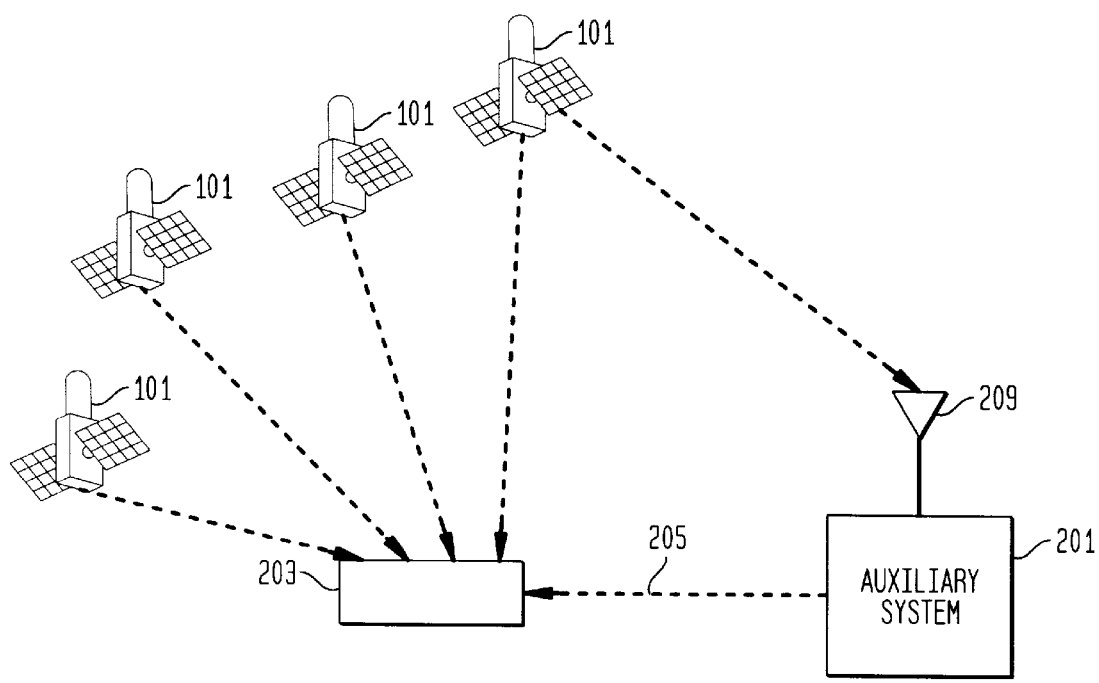
FIG. 2 illustrates a GPS system having an auxiliary system.

FIG. 2 shows a GPS satellite system having a constellation of satellites 101, a wireless terminal 203, and an auxiliary system 201. Auxiliary system 201 receives GPS signals from one or more satellites 110 at a GPS antenna 209 and demodulates the navigation data modulated onto the GPS signals. Auxiliary system 201 then forwards this information to wireless terminal 203 via wireless link 205. Wireless terminal 203 uses the demodulated navigation data to perform a data wipe-off operation to enable the integration interval to be increased (e.g., beyond 20 ms), thereby increasing the overall signal-detection capabilities at wireless terminal 203.

In the GPS system of FIG. 2, there is a delay from the time when the navigation data is demodulated at auxiliary system 201 to the time when wireless terminal 203 applies this information for the data wipe-off operation. Wireless terminal 203 stores GPS signals in memory while waiting for the corresponding demodulated navigation data information to arrive from auxiliary system 201. As a result, there is a delay in the position determination of wireless terminal 203. This technique also requires wireless terminal 203 to have a large memory for storing GPS signals received from satellites 101.

Figure 3:
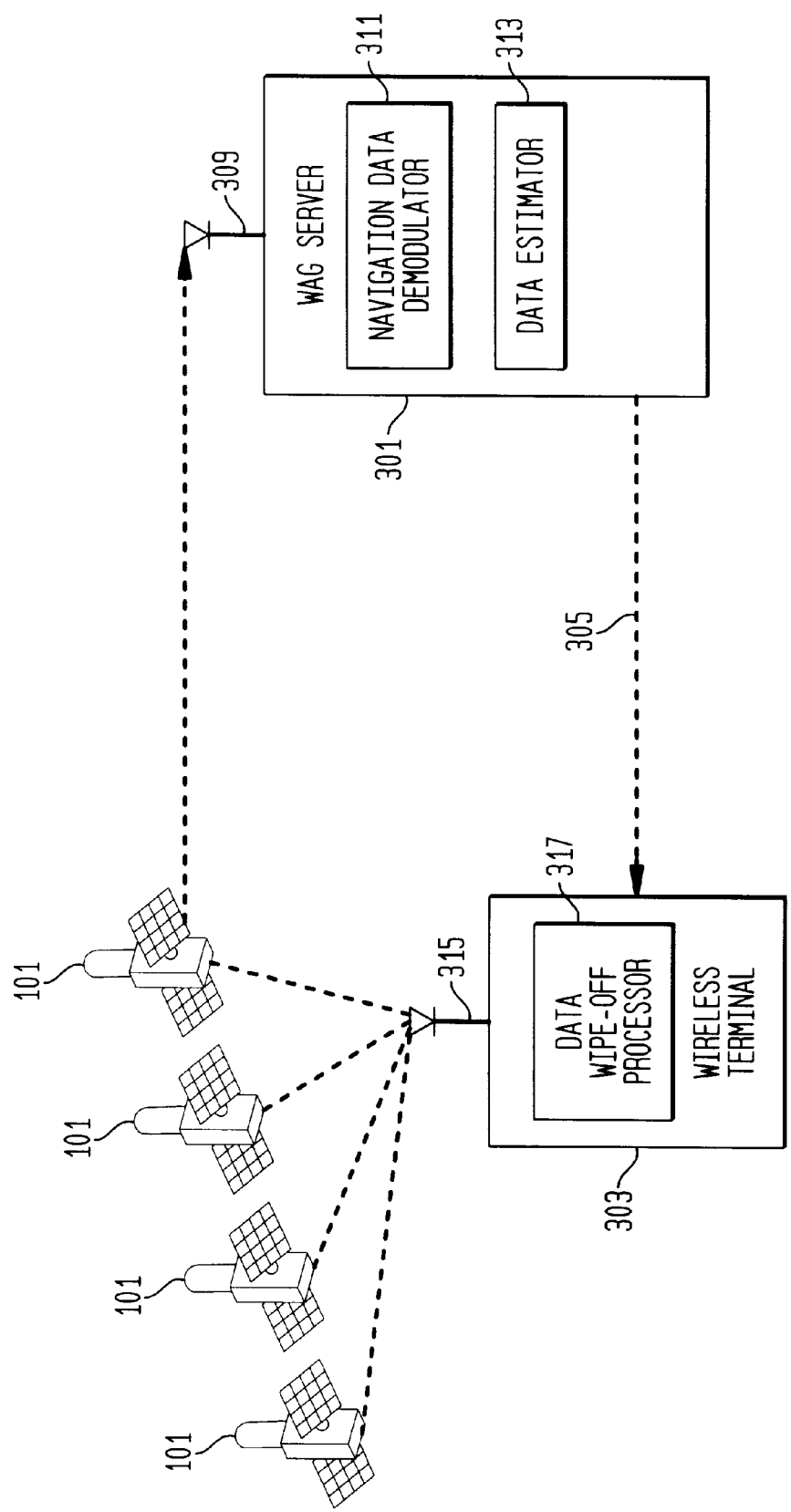
FIG. 3 is a block diagram illustrating a GPS system in accordance with a first embodiment of the present invention.

FIG. 3 is a block diagram illustrating a first embodiment of the present invention. In FIG. 3, there exists a satellite constellation (i.e., a plurality of satellites 101) capable of sending GPS signals to a wireless terminal 303. There also exists a Wireless assisted GPS (WAG) server 301 connected to wireless terminal 303 via a communication link 305. Depending on the application, communication link 305 may be a wireless link or a wire-line link. WAG server 301 comprises a GPS receiver 309, a navigation data demodulator 311, and a data estimator 313.

WAG server 301 assists in detection of GPS signals 102 by GPS receiver 105 configured with short or long integration times. WAG server 301 facilitates detection of GPS signals 102 by reducing the number of integrations to be performed by correlators searching for GPS signals 102. The number of integrations is reduced by narrowing the frequency range and code phase ranges to be searched. Specifically, WAG server 301 limits the search for GPS signals 102 to a specific frequency or frequencies and to a range of code phases less than the code phase spectrum $R_f(\text{spec})$.

GPS receiver 309 in the WAG server 301 acquires a GPS signal 102 transmitted from a satellite 101. Navigation data demodulator 311 then processes the GPS signal to demodulate navigation data modulated onto the GPS signal. This demodulated navigation data is then forwarded to data estimator 313 located within WAG server 301.

Data estimator 313 receives the current demodulated navigation data and estimates future navigation data. This estimation is based on the current and past measurements of navigation data as well as general knowledge about the known format standard of navigation data. For example, it is a well-known fact that navigation data comprises a plurality of navigation data-bits which are very repetitive in nature. Data estimator 313 is generally programmed with these well-known parameters and facts which help in the creation of the estimated navigation data.

The estimated navigation data is then forwarded to wireless terminal 303 via communication link 305. Wireless terminal 303 comprises a GPS receiver 315 and a data wipe-off processor 317. GPS receiver 315 is used to receive GPS signals from one or more transmitting satellites 101. Data wipe-off processor 317 uses the corresponding estimated navigation data received from WAG server 301 to perform a data wipe-off operation on the subsequent GPS signals. The subsequent GPS signals may correspond to the same satellite or different satellites. The integration interval may then be increased beyond 20 ms to increase the overall signal-detection sensitivity.

Wireless terminal 303 may perform the data wipe-off operation in real-time. Thus, the prior art problem of delay is avoided. Furthermore, since there is no wait period for receiving satellite navigation data information, prior art storage requirements at wireless terminal 303 are also reduced.

Thus, by the use of principles of the present invention, wireless terminal 303 may acquire GPS signals from satellites in real-time even when they are relatively weak. Wireless terminal 303 may acquire navigation data under faded conditions of low signal-to-noise ratio that are inadequate for the operation of a wireless terminal in the prior art.

WAG server 301 may be a terrestrial facility, an airborne facility, or a satellite in orbit around the earth. Data estimator 313 may be programmed to create estimated navigation data in accordance with well-known navigation estimation algorithms or some other estimation mechanisms. The principles of the invention are flexible in nature and the invention can be practiced with the use of different kinds of data-estimation schemes.

Furthermore, even though FIG. 3 illustrates data estimation capabilities being located in WAG server 301, in a second embodiment, the data estimation capabilities may be located within the wireless terminal.

Figure 4:
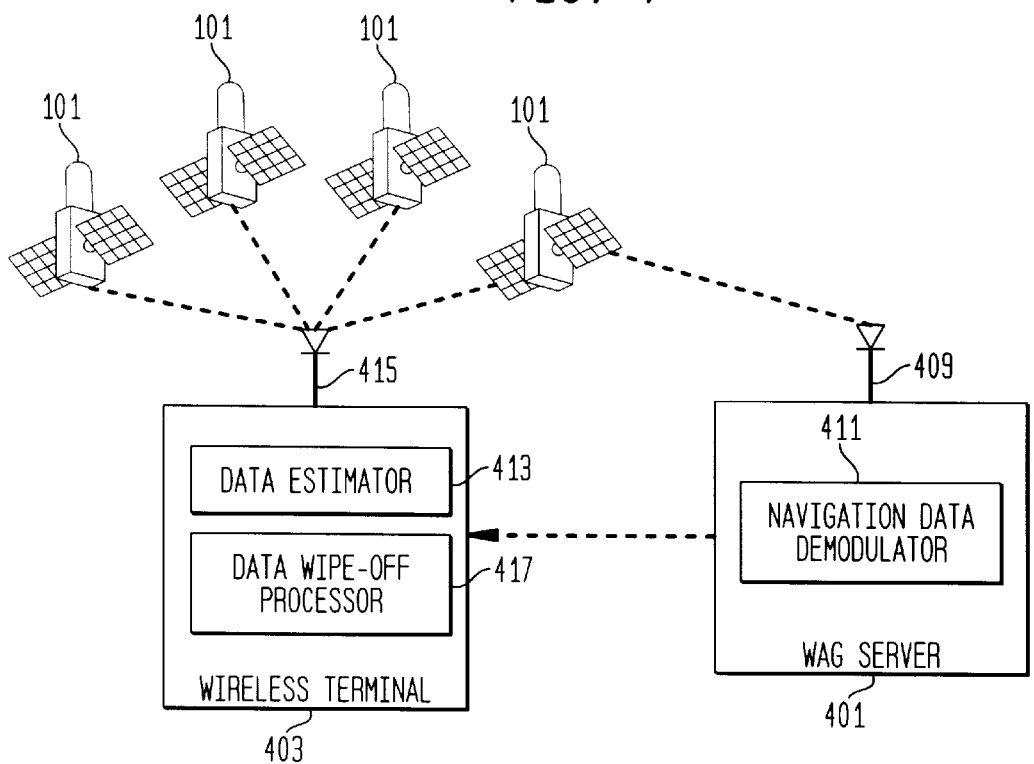
FIG. 4 is a block diagram illustrating a GPS system in accordance with a second embodiment of the present invention.

FIG. 4 is a block diagram illustrating a second embodiment of the present invention. In this embodiment, WAG server 401 comprises a GPS receiver 409, and a navigation data modulator 411. Data estimator 413 is located within wireless terminal 403. Wireless terminal 403 also comprises a GPS receiver 415 and a data wipe-off process 417.

WAG server 401 acquires a GPS signal from a satellite, demodulates the navigation data modulated on the GPS signal and transmits the demodulated data to wireless terminal 403.

Within wireless terminal 403, data estimator 413 estimates the future navigation data, and data wipe-off processor 417 uses the estimated navigation data to perform a data wipe-off operation on the subsequent GPS signals from different satellites.

Figure 5:
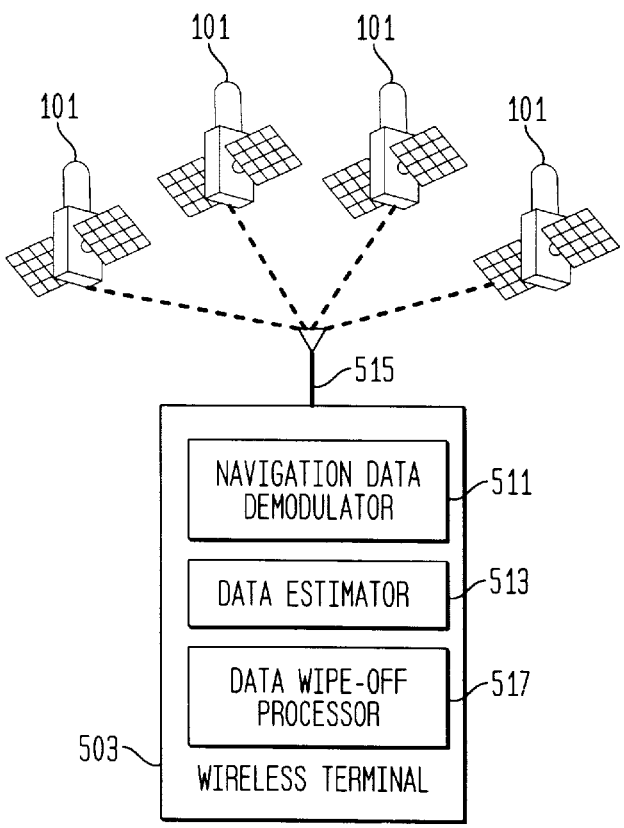
FIG. 5 is a block diagram illustrating a GPS system in accordance with a third embodiment of the present invention.

FIG. 5 yet illustrates a third embodiment of the present invention. In this embodiment, the WAG server is eliminated, and the steps of demodulation, the estimation, the data wipe-off, and the enlargement of integration interval are performed within the wireless terminal.

As shown in FIG. 5, in this embodiment, wireless terminal 503 comprises a GPS receiver 515, a navigation data demodulator 511, a data estimator 513, and a data wipe-off processor 517.

Figure 6:
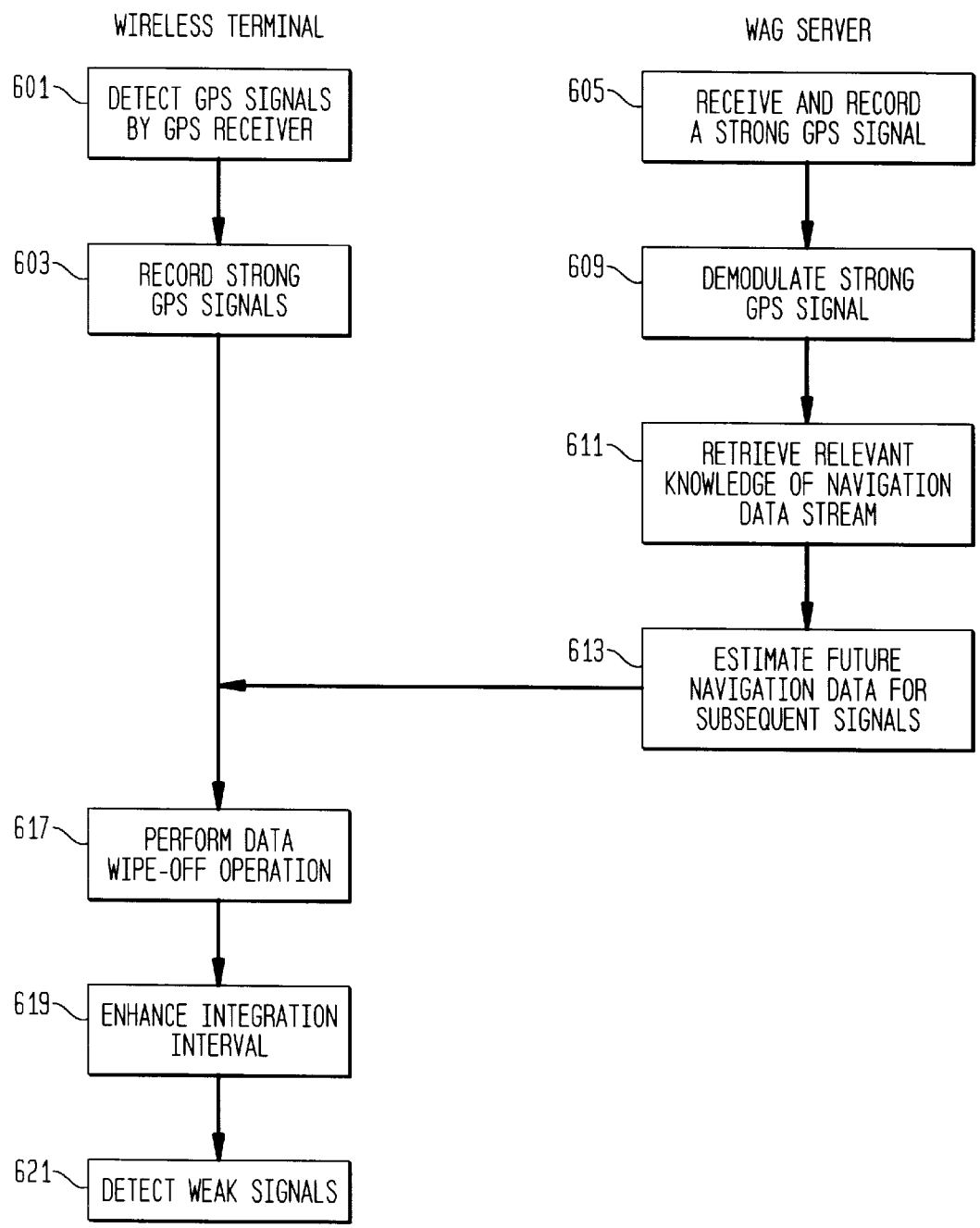
FIG. 6 is a flow-chart illustrating various steps involved in one embodiment of the present invention.

FIG. 6 is a flow-chart illustrating various steps involved in the enhancement of signal-detection capabilities by using estimated navigation data in accordance with the first embodiment of the present invention. This method is particularly useful for cases where the strength of one or more GPS signals is highly attenuated by buildings and other shadowed environments for a wireless terminal. A method for using navigation data information from strong GPS signals to detect weak GPS signals is disclosed.

In this method, first, the wireless terminal attempts to detect GPS signals received by its GPS receiver (block 601). In this attempt, strong GPS signals are detected and are recorded (block 603). The WAG server also receives and records a strong GPS signal from a satellite via its GPS receiver and records it (block 605). The WAG server then demodulates the navigation data modulated on the strong GPS signal (block 609). The WAG server also retrieves the relevant knowledge of navigation data streams generally known in a GPS system (block 611). Then, the WAG server utilizes the demodulated navigation data and the relevant general knowledge of navigation data to estimate future navigation data for the subsequent signals (block 613). The subsequent signals may correspond to the same satellite or different satellites.

Next, the WAG server forwards the estimated navigation data to the wireless terminal which utilizes the estimated navigation data to perform the data wipe-off operation on the subsequent GPS signals (block 617). The wireless terminal then enlarges its integration interval (block 619). The wireless terminal then detects weak GPS signals (block 621) by using the enlarged integration interval.

The method illustrated in FIG. 6 may be modified for use with or without a WAG server of FIG. 3. When a WAG server is present, the navigation data demodulation and navigation data estimation steps may be performed by the WAG server and the actual data wipe-off and signal-detection steps may be performed by the wireless terminal. In an alternative embodiment, the demodulation step may be performed by WAG server, and the navigation data estimation, data wipe-off, and signal-detection steps may be performed by the wireless terminal. In another alternative embodiment, the WAG server may be eliminated completely, and the signal detection, navigation data demodulation, and navigation data estimation steps along with the data wipe-off and signal-detection steps are performed within the wireless terminal.

The principles of the present invention may be utilized to further enhance the accuracy of currently available positioning techniques. Although conventional techniques determine a wireless position with some degree of accuracy, fluctuations in the atmosphere (e.g., the ionosphere) and jitter in the transmitted GPS signals prevent determining the position of a wireless terminal with a high degree of accuracy. The present invention may be utilized to enlarge the integration interval and mitigate the effects of these factors to improve the accuracy with which the position of a wireless terminal can be ascertained.

One goal of the illustrative embodiments is also to reduce signal acquisition and signal processing requirements of a conventional wireless terminal so that a wireless terminal in accordance with the principles of the present invention can determine its location more quickly and with weaker GPS signals than wireless terminals in the prior art.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for processing GPS signals modulated with navigation data, comprising the steps of:
    (a) recovering navigation data from a first GPS signal transmitted by a first satellite of a GPS system;
    (b) generating estimated navigation data based on the recovered navigation data; and
    (c) performing, at a wireless terminal, a data wipe-off operation on a subsequent GPS signal, received by the wireless terminal, wherein the data wipe-off operation is based on the estimated navigation data.

2. The invention of claim 1, wherein the subsequent GPS signal is transmitted by the first satellite and step (a) is performed at a server of the GPS system.

3. The invention of claim 2, wherein the server transmits the recovered navigation data to the wireless terminal and step (b) is performed at the wireless terminal.

4. The invention of claim 2, wherein step (b) is performed at the server and the server transmits the estimated navigation data to the wireless terminal.

5. The invention of claim 1, wherein the subsequent GPS signal is transmitted by a second satellite of the GPS system.

6. The invention of claim 5, wherein step (a) is performed at a server of the GPS system.

7. The invention of claim 6, wherein the server transmits the recovered navigation data to the wireless terminal and step (b) is performed at the wireless terminal.

8. The invention of claim 6, wherein step (b) is performed at the server and the server transmits the estimated navigation data to the wireless terminal.

9. The invention of claim 5, wherein steps (a), (b), and (c) are performed at the wireless terminal.

10. The invention of claim 1, wherein the wireless terminal enlarges its integration interval to detect the subsequent GPS signal after the data wipe-off operation.

11. The invention of claim 10, wherein the enlarged integration interval is greater than 20 ms.

12. The invention of claim 10, wherein the wireless terminal detects the subsequent GPS signal without having to buffer the subsequent GPS signal.

13. The invention of claim 10, wherein the subsequent GPS signal is transmitted by the first satellite, and the step (a) is performed at a server of the GPS system, and the server transmits the recovered navigation data to the wireless terminal and step (b) is performed at the wireless terminal.

14. The invention of claim 10, wherein the subsequent GPS signal is transmitted by the first satellite and steps (a) and (b) are performed at a server of the GPS system, and the server transmits the estimated navigation data to the wireless terminal.

15. The invention of claim 10, wherein the subsequent GPS signal is transmitted by a second satellite of the GPS system, and step (a) is performed at a server of the GPS system, and the server transmits the recovered navigation data to the wireless terminal and step (b) is performed at the wireless terminal.

16. The invention of claim 10, wherein the subsequent GPS signal is transmitted by a second satellite of the GPS system, and steps (a) and (b) are performed at a server of the GPS system, and the server transmits the estimated navigation data to the wireless terminal.

17. The invention of claim 10, wherein the subsequent GPS signal is transmitted by a second satellite of the GPS system, and steps (a), (b), and (c) are performed at the wireless terminal.

18. A server for a GPS system, comprising:
    (a) a GPS receiver configured to receive a first GPS signal modulated with navigation data and transmitted from a first satellite of the GPS system;
    (b) a demodulator configured to recover the navigation data from the received first GPS signal; and
    (c) an estimator configured to generate estimated navigation data from the recovered navigation data, wherein the server is configured to transmit the estimated navigation data for receipt by a wireless terminal configured to perform a data wipe-off operation based on the estimated navigation data.

19. The invention of claim 18, wherein the estimated navigation data corresponds to the first satellite.

20. The invention of claim 18, wherein the estimated navigation data corresponds to a second satellite of the GPS system.

21. A wireless terminal for a GPS system, comprising:
    (a) a GPS receiver configured to receive GPS signals modulated with navigation data; and
    (b) a data wipe-off processor configured to perform a data wipe-off operation on a GPS signal transmitted by a satellite in the GPS system based on estimated navigation data.

22. The invention of claim 21, wherein the wireless terminal receives the estimated navigation data from a server in the GPS system.

23. The invention of claim 22, wherein the estimated navigation data corresponds to a previous GPS signal from the satellite.

24. The invention of claim 22, wherein the estimated navigation data corresponds to a previous GPS signal from another satellite of the GPS system.

25. The invention of claim 21, wherein the wireless terminal further comprises an estimator configured to generate the estimated navigation data from recovered navigation data.

26. The invention of claim 25, wherein the wireless terminal receives the recovered navigation data from a server in the GPS system.

27. The invention of claim 26, wherein the recovered navigation data corresponds to a previous GPS signal from the satellite.

28. The invention of claim 26, wherein the recovered navigation data corresponds to a previous GPS signal from another satellite of the GPS system.

29. The invention of claim 25, wherein the wireless terminal further comprises a demodulator configured to generate the recovered navigation data corresponding to a GPS signal received from another satellite of the GPS system.

30. The invention of claim 21, wherein the wireless terminal enlarges its integration interval to detect the GPS signal after the data wipe-off operation.

31. The invention of claim 30, wherein the enlarged integration interval is greater than 20 ms.

32. The invention of claim 30, wherein the wireless terminal detects the GPS signal without having to buffer the GPS signal.

* * * * *